April 7, 1959

C. E. FORKEL ET AL 2,880,983

PEBBLE HEATING CHAMBER

Filed Jan. 18, 1954

INVENTORS
C. E. FORKEL
D. S. HALL
C. L. SEYER

BY Hudson and Young

ATTORNEYS

April 7, 1959   C. E. FORKEL ET AL   2,880,983
PEBBLE HEATING CHAMBER

Filed Jan. 18, 1954   3 Sheets-Sheet 2

INVENTORS
C. E. FORKEL
D. S. HALL
C. L. SEYER
BY
ATTORNEYS

United States Patent Office 2,880,983
Patented Apr. 7, 1959

2,880,983

PEBBLE HEATING CHAMBER

Curt E. Forkel, Bartlesville, Okla., Dick S. Hall, Borger, Tex., and Chester L. Seyer, Bartlesville, Okla., assignors to Phillips Petroleum Company, a corporation of Delaware Application January 18, 1954, Serial No. 404,464

12 Claims. (Cl. 263—19)

This invention relates to a pebble heater apparatus. In one of its more specific aspects, the invention relates to pebble heating chambers in pebble heating apparatus. In another of its more specific aspects, the invention relates to a process for effecting contact between fluids and solid heat exchange materials.

Apparatus generally used in carrying out thermal conversion processes wherein a flowing mass of solid heat exchange material, heated to a high temperature by passing hot gas therethrough in a first heat exchange relation, is thereafter caused to contact gaseous reactant material in a second direct heat exchange relation is called pebble heater apparatus. Pebble heater apparatus can be advantageously utilized in various processes such as hydrocarbon conversion, gas absorption, and gas-solid heat exchange in general. A principal use of pebble heater apparatus is in the conversion of hydrocarbons, involving thermal or catalytic processes such as cracking, hydrogenation, dehydrogenation, isomerization, polymerization, oxidation, and the like.

Solid heat exchange material which is conventionally used in pebble heater apparatus is generally called "pebbles." For a more detailed description of the pebbles which can be utilized herein, reference may be had to U.S. Patent No. 2,536,436.

Conventional pebble heater apparatus usually comprises a series of at least two chambers positioned substantially in vertical alignment with each other. The upper and lower chambers are sometimes referred to, respectively, as the pebble heating chamber and the gas reaction chamber. Most conventional pebble heating chambers are provided with a combustion chamber positioned adjacent to or in close proximity to the sides of the lower portion of the heating chamber. Hot gas from the combustion chamber is injected through the sides of the heating chamber and passed therein countercurrently in contact with the downflowing contiguous mass of pebbles. The hot gas in contact with the pebble mass transfers heat thereto in a first direct heat exchange relation, the effluent gas being removed thereafter from the upper portion of the heating chamber. Hot pebbles are then passed downwardly from the heating chamber through a pebble throat into the gas reaction chamber where they are contacted in countercurrent flow with gaseous reactant materials in a second direct heat exchange relation. Effluent gas from the gas reaction chamber is withdrawn from the top portion thereof while relatively cool pebbles gravitate from the lower portion of that chamber and are subsequently recycled to the top portion of the pebble heating chamber.

One disadvantage of such conventional pebble heater apparatus is that pebbles near the periphery of the pebble bed in the heating chamber are heated to a higher temperature than those in the center of the downwardly flowing bed. This is due to the fact that a greater proportion of the combustion gas tends to take the path of least resistance through the peripheral portion of the pebble bed. In most pebble heater apparatus, pebbles are introduced into the heating chamber through a single pebble inlet opening while pebbles are withdrawn from a point substantially centrally located in the bottom of the heating chamber. As pebbles flow through the chamber, they tend to form a cone extending downwardly and outwardly from the pebble inlet while the pebbles flowing out of the chamber tend to form an inverted cone downwardly and inwardly toward the pebble outlet. Because of the cone-shaped top and bottom of the bed, the area near the periphery of the bed is usually the thinnest and the area of least resistance for upwardly flowing gas. Gas tends to pass directly upwardly from the gas inlet, through the periphery of the bed and out of the effluent outlet in the top of the chamber. It is apparent that gas flowing upwardly through the periphery of the pebble bed has a shorter pebble contact time than when passing through the central portion or an intermediate portion of the pebble bed. And since the major proportion of the hot combustion gas introduced to the conventional pebble heating chamber traverses the shorter vertical paths, less heat is transferred to the pebble mass per unit volume of gas than would be transferred if contact time between gas and pebbles were uniform throughout the chamber. Such a state of conditions results in inefficient utilization of the combustion gases so that effluent gases leaving the chamber carry away a considerable amount of heat which could have been imparted to cooler pebbles in the central portion of the pebble bed.

Another disadvantage of conventional pebbles heating chambers, which is closely associated with that of non-uniform contact time between combustion gas and pebbles, as discussed above, arises because of the difficulty in establishing uniform flow of pebbles through the chamber. In a chamber in which the withdrawal of pebbles is made from a substantially central point in the bottom of the chamber, there is a tendency for the pebble bed to drop out at all levels in the pebble bed below a dimension in the neighborhood of less than one and one-half times the diameter of the cylinder served by the single pebble outlet. Because of this drop out of pebbles, pebbles flowing in the central portion of the chamber have a shorter residence time therein than pebbles in the peripheral portions. Accordingly, pebbles in the central portion of the pebble bed are in contact with less combustion gas for a shorter period of time than those in other parts of the chamber.

As a result of the non-uniform contact time between the pebbles and combustion gas, the pebbles leaving the pebble heating chamber and entering the gas reaction chamber are unevenly heated. Operation in this manner causes an uneven reaction of gases in the gas reaction chamber with overreacting of gases occurring in some parts of the chamber while underreacting of gases takes place in other portions. The final result is a low product yield at a greatly reduced conversion efficiency.

Still other disadvantages arise because of structural weaknesses inherent in the design of certain conventional pebble heater apparatus. In that type of apparatus in which a combustion gas is introduced through the side walls of the heating chamber, an area of structural weakness is created in the lower portion of that chamber by the openings in the walls. When operating pebble heater apparatus, it becomes necessary at times to alternately cool down and heat up the pebble heating chamber, thereby causing contraction and expansion of the refractory material forming the walls of the chamber. The refractory material in the lower portion of the chamber through which combustion gas openings are provided is thereby caused to move in and out, leaving cracks into which pebbles can flow and wedge. In time, after several shut downs, the cracks may become enlarged to the extent that pebbles can pass into the combustion chamber surrounding the heating chamber. In some cases refractory material may become dislodged, falling into the bottom of the heating chamber and blocking flow of pebbles therethrough. And further, because of the additional openings, non-uniform flow of combustion gases into the heating chamber will result.

Another point of structural weakness in conventional pebble heater apparatus occurs at the junction of the pebbles outlet conduit with the bottom of the pebble heating chamber. Since the junction of these two members is close to where the hot combustion gases enter the heating chamber and where the heated pebbles leave that chamber, it is subjected constantly to a very high temperature. The final result may be a forced shut down of the apparatus because of the failure of the joint to withstand extended heating to such high temperatures.

The following objects of the invention will be attained by the various aspects of the invention.

An object of the invention is to provide an improved means for thermally treating or reacting gaseous materials.

Another object is to provide improved means for heating solid heat exchange material in a pebble heating chamber.

Still another object is to provide an improved method of flowing pebbles through a pebble heating chamber.

A further object is to provide an improved method for heating pebbles in pebble heater apparatus whereby the heating gas is evenly distributed through the pebble bed in the pebble heating chamber.

Yet a further object is to provide an improved combustion chamber for a pebble heating chamber wherein the heating gas is evenly distributed in the combustion chamber.

A still further object is to provide an improved combustion chamber for a pebble heating chamber, including improved means for passing heating gas from the combustion chamber into the pebble heating chamber.

Still another object is to provide a pebble soaking chamber adjacent the lower portion of the pebble heating chamber so that any differential in pebble temperature which may exist on removal of the pebbles from the pebble heating chamber can be equalized before introduction into the pebble reaction chamber.

Another object is to provide means for preventing failure of the joint at the junction of the pebble outlet conduit and the bottom of a pebble heater.

Yet another object is to provide means for preheating the combustion air prior to introduction to the heaters of the combustion chamber of a pebble heating chamber.

Other and further objects will be apparent to those skilled in the art on reference to the accompanying disclosure.

A more complete understanding of the invention may be obtained by reference to the following description and the drawing, in which.

Figure 1:
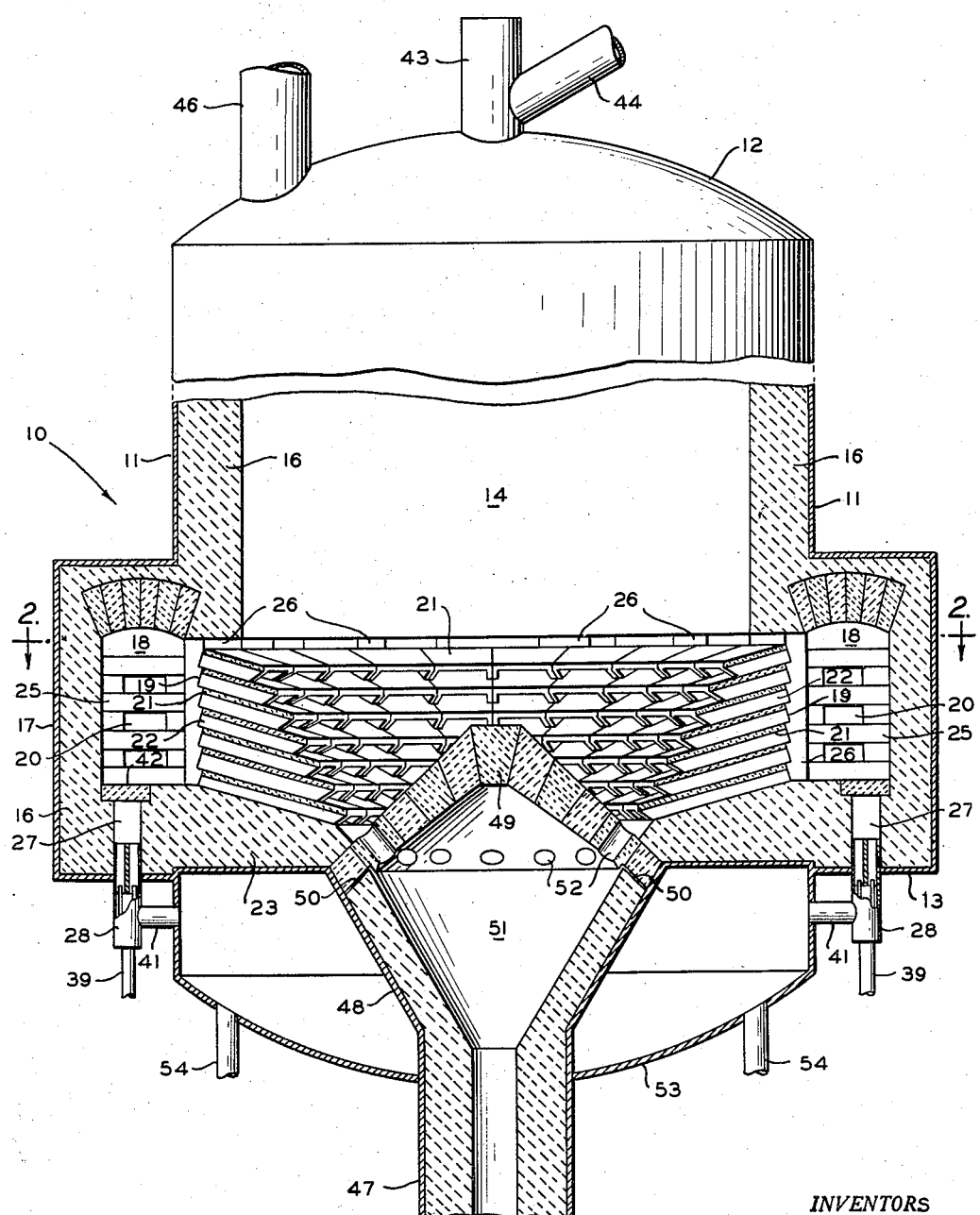
Figure 1 is an elevation, partly in section, of a pebble heating chamber embodying the invention.

Referring to the drawing and in particular to Figure 1, pebble heater 10 comprises shell 11, closed at its ends by upper and lower closure members 12 and 13, respectively, encompassing pebble heating chamber 14. The walls of shell 11 are lined with insulating means, including super-refractory and common refractory materials 16. Common refractory materials may include block insulation, insulating firebrick, fire clay firebrick and like material. Superrefractory materials may include silicon carbide, mullite, alumina, or any other suitable refractory having physical and chemical properties which give it sufficient strength to withstand a reasonably heavy load and a high temperature without substantial breakage or deterioration. Silicon carbide may be satisfactorily used in operations utilizing temperatures up to 3000° F. Mullite can also be satisfactorily employed at temperatures up to about 3000° F. while alumina may be used at temperatures up to about 3300° F. The bottom portion of the shell above closure member 13 as well as the enlarged portion of the shell, to be discussed hereinafter, are also lined with layers of common or super refractory materials or both.

The lower portion 17 of shell 11 is enlarged so as to form combustion chamber 18 therein surrounding the low portion of pebble heating chamber 14. Combustion chamber 18 is separated from the pebble heating chamber by means of wall 19 formed by the combustion chamber ends of bricks 21. The combustion chamber and the heating chamber are communicated with one another by downwardly extending combustion gas conduits or ducts 22 formed by bricks 21 as explained hereinafter. The bricks, constructed of super-refractory materials, are cast substantially in the shape of an inverted U. By placing one brick upon another and positioning them in the lower portion of the pebble heating chamber as described below, it has been possible to provide a pebble heater of great structural strength which overcomes many of the disadvantages of conventional pebble heaters. The underneath portion of one brick and the top of the next succeeding lower brick form a combustion gas duct. In the case of the lowermost ducts, the insulating means in the bottom of the pebble heating chamber serves as the lower side of the ducts 22. The bricks are arranged concentrically in layers around the bottom of the pebble heating chamber, the lowermost bricks resting on insulating means in the bottom of the pebble heating chamber. The aforementioned insulating means is sloped inwardly toward the center of the pebble heating chamber so that the bricks and the ducts extend inwardly and downwardly from the combustion chamber into the pebble heating chamber. The heating chamber ends of the uppermost layer of bricks are adjacent or near the walls of the heating chamber while each successive lower layer of bricks extend progressively farther into the lower portion of the heating chamber. The inner or heating chamber ends of the bricks are cut outwardly from the center of the heating chamber and downwardly, thereby lessening the drag on the pebbles, reducing combustion gas pressure drop and preventing a build-up of stagnant pebbles at the ends of the ducts.

Figure 2:
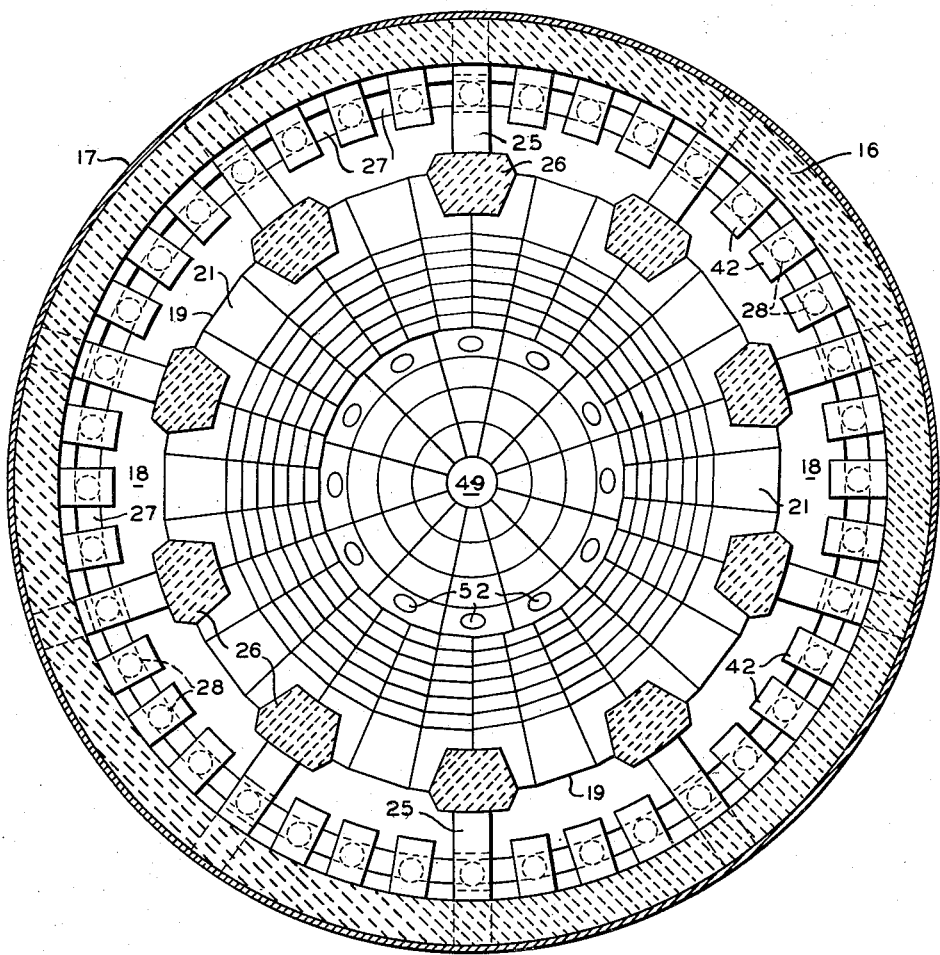
Figure 2 is a horizontal section taken along the line 2—2 of Figure 1.

Better understanding of the disposition of bricks 21 and the structure of the combustion gas ducts can be obtained by reference to Figure 2. As shown in Figure 2, bricks 21 are wedge shaped, and completely encircle the bottom of the heating chamber. By utilizing this form of construction, slippage of the bricks inwardly into the heating chamber is prevented. Furthermore, by positioning the bricks so that they extend inwardly and downwardly into the heating chamber, pebbles flowing downwardly through the heating chamber are prevented from entering the combustion chamber through the combustion gas ducts. Flow of pebbles through the combustion gas ducts is additionally prevented by cutting the inner ends of the bricks outwardly from the center of the heating chamber and downwardly as mentioned above. The inner ends of the bricks when in place are cut outwardly at an angle with the vertical greater than the angle of repose of the pebbles and preferably at an angle of about 60° with the vertical. The angle of slope of the bricks, i.e., the angle the top surface of a brick makes with the horizontal, is in the range of between 10 and 20°, an angle of about 15° being preferred. It is also within the scope of the invention to form a bead or ridge of refractory material across the lower sides of the ducts in order to obstruct the flow of any pebbles into the combustion chamber which might result notwithstanding the slope given the bricks.

Referring to both Figures 1 and 2, a plurality of support columns 26 extend between the insulating means 16 and 23 lining the walls and the bottom of the heating chamber. These columns formed of suitable refractory material, serve to support insulating lining 16. Furthermore, by placement of the columns against one end of bricks 21 as shown, the bricks are held firmly in place and are prevented from backing up. A retaining wall 25 is disposed behind each of the columns 26 so as to prevent outward movement of the columns. In order to permit free flow of combustion gas through the combustion chamber and thereby equalize the pressure in the combustion chamber, walls 25 are perforated as by openings 20. Walls 25 may be formed of layers of bricks, the layers being alternately continuous and broken as shown in Figure 1. While the retaining walls may extend to the arched roof of combustion chamber 18, it is preferred to leave a space thereabove for passage of combustion gas.

An annular tunnel 27 is formed in the lower portion of the combustion chamber by utilizing appropriate shapes of refractory material, the upper side of the tunnel being open to combustion chamber 18. Around the lower portion of combustion chamber 18 there are installed a plurality of substantially upright burners 28 which communicate with the annular tunnel of the combustion chamber. The burners as illustrated are of the nozzle-mix type, but it is not intended to limit the invention to any specific type of burner. Additional burners, equipped with igniters for lighting under pressure, may be provided in the combustion chamber as pilot burners, horizontally positioned above one or more of upright burners 28. A plurality of baffle members, such as refractory bricks 42, are positioned across the top of the annular tunnel above each of the upright burners. The number of upright burners disposed around the lower portion of the combustion chamber is such that if the flame of any one burner is extinguished, the flame of an adjacent burner is deflected by a refractory brick so as to immediately light that burner. To state the proposition in another way, the number of burners provided is such that the flames of adjacent burners are caused to overlap by the refractory bricks placed above the burners.

Figure 3:
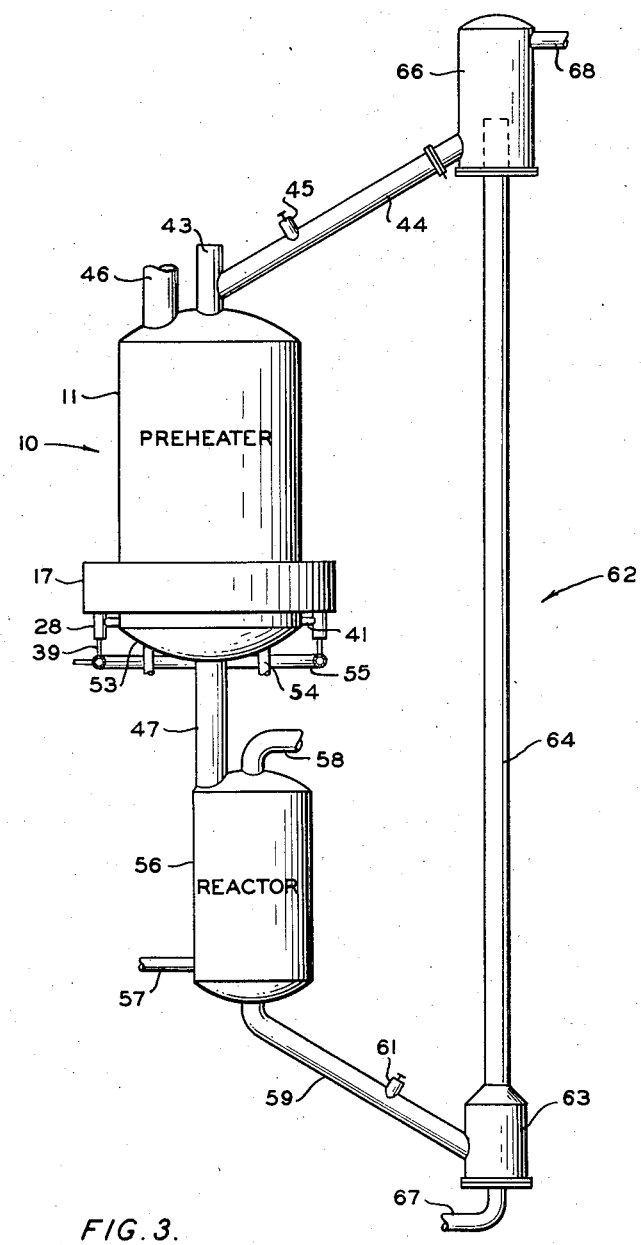
Figure 3 is a schematic view of a pebble heater apparatus utilizing the pebble heating chamber of this invention.

Pebble inlet 43 is attached to upper closure member 12 to provide means for introducing pebbles into the upper portion of the pebble heating chamber. Pebble conduit 44 connects pebble inlet 43 to a pebble elevating means as shown in Figure 3. Gaseous effluent outlet 46 is attached to upper closure member 12 for withdrawal of the combustion gas.

Pebble outlet means 47 is attached to bottom closure member 13 of shell 11. As illustrated, pebble outlet means 47 is a conduit lined with insulating means and having a flared upper end 48. A substantially conical baffle member or dome 49 is disposed in the lower portion of the pebble heating chamber immediately above the flared end 48 of the pebble outlet means 47. The baffle member is constructed of super-refractory bricks in the form of plugs which taper inwardly from top to bottom so that the member is self-supporting as well as capable of supporting the pebble bed within the pebble heating chamber. An expansion joint 50, packed with an insulation material such as Fiberfrax, is provided between the upper end of the insulation material lining the flared end 48 of pebble outlet means 47 and conical baffle member 49. The expansion joint is shielded from entry of pebbles by a projection of the super-refractory bricks which are a part of the dome and adjacent the expansion joint. By providing for the expansion joint, the insulation material lining the pebble outlet means can expand without causing the lifting of the conical baffle member. A pebble soaking chamber 51 is formed within the flared end 48 of pebble outlet means 47 and the underneath portion of conical baffle member 49. Disposed around the lower periphery of conical baffle member 49 are a plurality of pebble conduits 52 which communicate the pebble heating chamber 14 with pebble soaking chamber 51. An air plenum chamber 53, fitted with air inlet means 54, is disposed below lower closure member 13 of shell 11 and surrounds the flared end of pebble outlet means 47, thereby providing means for cooling the hot refractory supporting members. Air inlet lines 41 of burners 28 are connected to plenum chamber 53 in order to furnish preheated air to support the combustion of the fuel passed into burners 28 through line 39.

Referring to Figure 3, shell 11 containing pebble heating chamber 14 is disposed substantially in vertical alignment with shell 56 which encompasses the gas reaction chamber. Header member 55 provides means for supplying fuel to the plurality of burners 28, only two of which are illustrated, positioned in the lower portion of the combustion chamber. Pebble outlet means 47 extends between the bottom of the pebble heating chamber and the top of the gas reaction chamber. Reactant material inlet means, such as conduit 57, is provided in the lower portion of shell 56 while an effluent outlet means, such as conduit 58, is positioned in the upper portion of that shell. Pebble outlet conduit 59 provided with a pebble flow control means 61, such as a gate valve, star valve or table feeder, is connected to the lower end of pebble elevating means 62. As illustrated, the elevating means is a gas-lift elevator comprising an engaging pot 63, a gas lift conduit 64 and a disengaging chamber 66. A lift-gas inlet line 67 is connected to the lower end of the elevator while an effluent outlet 68 is provided in the upper part of the elevator. Pebble conduit 44, extending between the disengaging chamber of the elevator and pebble inlet conduit 43, is provided with a pebble flow control means 45 such as a gate valve. Identical numerals have been utilized to designate elements previously described in conjunction with the discussion of Figure 1.

In the operation of the apparatus of Figures 1 and 3 of the drawing, pebbles, made of a heat exchange material suitable for the process to be carried on within the apparatus, are introduced into pebble heating chamber 14 through pebble inlet 43. The pebbles pass downwardly through the pebble heating chamber and form a contiguous bed of pebbles extending through pebble heating chamber 14 and the gas reaction chamber formed within shell 56. Gaseous combustible material is introduced into burners 28 through lines 39 and is mixed in the burners with an oxygen-containing gas such as air. The air is supplied to the burners through lines 41 from plenum chamber 53 wherein the air is preheated by coming in contact with flared end 48 of pebble outlet means 47 and lower closure member 13 of shell 11. The air, in being heated in plenum chamber 53, cools pebble outlet means 47 and lower closure member 13, thereby preventing failure of the joint at the junction of these two members. The air and the fuel gas burn in tunnel 27 forming combustion gas which flows upwardly into combustion chamber 18. Refractory bricks 42, positioned above each of the upright burners serve to hold the combustible mixture of air and fuel back in the tunnel, thereby providing a longer residence time therein and promoting complete burning of the combustible mixture. Since the burners are disposed around the entire lower portion of the combustion chamber, combustion gas is evenly distributed throughout and completely fills that chamber. Refractory bricks 42 are also positioned above each burner so that the flame from any burner is deflected and contacts the flame from burners on either side. By operating in this manner, means are thereby provided for preventing the flame of any burner from becoming extinguished and allowing a build up of unburned gaseous material in the combustion chamber, thus reducing the possibility of an explosion within that chamber.

The combustion gas passes from combustion chamber 18 through combustion gas ducts 22 into pebble heating chamber 14. Because of the construction of the ducts as previously described, the combustion gas is passed concentrically into different portions of the pebble bed. Because of this manner of introduction, the gas is distributed uniformly throughout the pebble bed, and there is no tendency for the gases to flow along the periphery of the pebble bed as in conventional pebble heating chambers. Since the combustion gas ducts slope downwardly into the pebble heating chamber and since the inner ends of bricks 21 are cut outwardly from the center of the heating chamber and downwardly, pebbles are prevented from flowing into the combustion chamber. As the combustion gas passes from the ducts, it rises through the bed of pebbles in direct heat exchange therewith, heating the pebbles to the desired high temperature. After the combustion gas passes from the top of the pebble bed, it escapes from the chamber through effluent outlet 46.

The heated pebbles pass downwardly through pebble outlets 52 in conical baffle member 49 into soaking chamber 51. By positioning conical baffle member 49 in the lower portion of the pebble heating chamber, the tendency of the central portion of the pebble bed to drop out is obviated, thereby allowing a longer contact time between the pebbles in the central portion of the pebble bed and the combustion gas than is possible in conventional pebble heater apparatus. The pebbles leaving the pebble heating chamber through pebble outlet conduit 47 remain momentarily within pebble soaking chamber 51 where any temperature differential which may still exist between the pebbles is further equalized.

The heated pebbles pass downwardly from pebble soaking chamber 51 through pebble outlet conduit 47 into the gas reaction chamber within shell 56. Gaseous reactant materials are injected into the lower portion of the gas reaction chamber through inlet conduit 57. The gaseous materials rise through the reaction chamber contacting the downwardly flowing pebbles in a direct heat exchange relation and undergo reaction. The gaseous effluent passes rapidly out of the reaction chamber through effluent outlet conduit 58 and is then introduced into a quenching means, not shown, for cooling to a temperature at which the desired product is stable. Pebbles cooled as a result of the reaction, are removed from the bottom of the gas reaction chamber through pebble outlet 59 and are recycled to the upper portion of the pebble heating chamber by gas lift elevator 62. It is to be understood that while the pebble heater apparatus has been described and discussed in terms of a thermal conversion process, the invention can also be utilized with flowable solid heat exchange material employed solely as a heat transfer material, or as a catalytic material in the treatment of hydrocarbons.

It will be apparent that by providing a pebble heating chamber of the type described hereinbefore, we have made possible a method of pebble heater operation which substantially overcomes many of the disadvantages encountered with conventioanl apparatus. Accordingly, by utilizing the method of this invention in heating solid heat exchange material in pebble heater apparatus, it is possible to obtain uniform heating of that material. And by providing uniformly heated heat exchange material for use in the gas reaction chamber, high overall product yield and conversion efficiency is made possible.

As will be evident to those skilled in the art, various modifications of this invention can be made or followed in the light of the foregoing disclosure without departing from the spirit or scope of the disclosure.

We claim:
1. In a pebble heater apparatus utilizing a gravitating bed of heated pebbles, an improved pebble heating chamber which comprises a substantially upright, closed shell enclosing a heating chamber therein; pebble inlet and effluent outlet means in the upper portion of said shell; a combustion chamber disposed about the lower periphery of said heating chamber; heating means disposed in said combustion chamber, said heating means comprising a plurality of substantially upright burners disposed around the lower portion of said combustion chamber; baffle members positioned above each of said burners; substantially annular layers of combustion gas ducts formed of wedge-shaped bricks of refractory material in the shape of an inverted U, each side of each brick being in contact with a side of an adjacent brick, said bricks extending inwardly and downwardly from said combustion chamber into said heating chamber; an imperforate pebble outlet conduit attached to the lower portion of said shell, the upper end of said conduit being flared; a substantially conical, imperforate baffle member disposed in the lower portion of said heating chamber above and in contact with the flared end of said pebble outlet conduit; and a plurality of pebble conduit means disposed around the periphery of the lower portion of said conical baffle member communicating said heating chamber with a pebble soaking chamber formed by said baffle member and the flared end of said pebble outlet conduit.

2. The apparatus of claim 1 in which a plenum chamber, provided with inlet and outlet means, is disposed adjacent the bottom of said shell and around the flared end of said pebble outlet conduit.

3. The apparatus of claim 2 in which each of said burners are connected to the outlet means of said plenum chamber.

4. In a pebble heater apparatus utilizing a gravitating bed of heated pebbles, an improved pebble heating chamber which comprises a substantially upright, closed shell enclosing a heating chamber therein; pebble inlet and effluent outlet means in the upper portion of said shell; a combustion chamber disposed about the lower periphery of said heating chamber; combustion gas ducts formed of refractory material communicating said heating chamber and said combustion chamber; an annular tunnel formed in the bottom of said combustion chamber, the upper side of said tunnel being open to said combustion chamber; a plurality of substantially upright burners disposed around the lower portion of said combustion chamber and extending into said tunnel; baffle members positioned across said tunnel above each of said burners; and pebble outlet means in the lower portion of said shell.

5. In a pebble heater apparatus utilizing a gravitating bed of heated pebbles, an improved pebble heating chamber which comprises a substantially upright, closed shell enclosing a heating chamber therein; pebble inlet and effluent outlet means in the upper portion of said shell; a combustion chamber disposed about the lower periphery of said heating chamber; combustion gas ducts formed of wedge-shaped bricks of refractory material in the shape of an inverted U, each side of each brick being in contact with a side of an adjacent brick, said gas ducts communicating said heating chamber and said combustion chamber; a plurality of substantially upright burners disposed around the lower portion of said combustion chamber; baffle members positioned above each of said burners; a pebble outlet conduit in the lower portion of said shell; a plenum chamber disposed adjacent the bottom of said shell and encompassing the upper end of said pebble outlet conduit; inlet means connected to said plenum chamber; and outlet means connected to said plenum chamber, said outlet means being further connected to each of said burners.

6. In a pebble heater apparatus utilizing a gravitating bed of heated pebbles, an improved pebble heating chamber which comprises a substantially upright, closed shell enclosing a heating chamber therein; pebble inlet and effluent outlet means in the upper portion of said shell; an imperforate pebble outlet conduit in the lower portion of said shell, the upper end of said conduit being flared; a substantially conical, imperforate baffle member disposed in the lower portion of said heating chamber immediately above and in contact with the flared end of said pebble outlet conduit; a plurality of pebble conduit means disposed around the periphery of the lower portion of said conical baffle member and communicating said heating chamber with a pebble soaking chamber formed by said conical baffle member and the flared end of said pebble outlet conduit; a combustion chamber disposed about the lower periphery of said heating chamber; combustion gas ducts formed of refractory material extending inwardly and downwardly from said combustion chamber into said heating chamber, said ducts being disposed in substantially annular layers, the heating chamber ends of the uppermost layer being adjacent the walls of said heating chamber and each successive lower layer extending progressively farther into said heating chamber; an annular tunnel formed in the bottom of said combustion chamber, the upper side of said tunnel being open to said combustion chamber; a plurality of substantially upright burners disposed around the lower portion of said combustion chamber and extending into said annular tunnel; baffle members positioned across said annular tunnel above each of said burners; and a plenum chamber disposed below said shell and around the flared end of said pebble outlet conduit, said plenum chamber being provided with inlet and outlet means.

7. The apparatus of claim 6 in which said outlet means of said plenum chamber is connected to each of said burners.

8. In a pebble heater apparatus utilizing a gravitating bed of heated pebbles, an improved pebble heating chamber which comprises a substantially upright, closed shell enclosing a heating chamber therein; refractory material lining the interior of said shell so as to insulate same; pebble inlet and effluent outlet means in the upper portion of said shell; an imperforate pebble outlet conduit in the lower portion of said shell, the upper end of said conduit being flared; a substantially, imperforate conical baffle member disposed in the lower portion of said heating chamber immediately above and in contact with the flared end of said pebble outlet conduit; an expansion joint between said conical baffle member and the flared end of said pebble outlet conduit; a pebble soaking chamber formed by said conical baffle member and the flared end of said pebble outlet conduit; a plurality of pebble conduit means disposed around the periphery of the lower portion of said conical baffle member communicating said heating chamber with said pebble soaking chamber; a combustion chamber disposed about the lower periphery of said heating chamber; a plurality of supporting columns formed of refractory material disposed in the lower portion of said heating chamber adjacent to said combustion chamber and extending between the refractory material lining the walls of said shell and the bottom portion of said shell; a perforated retaining wall positioned between each of said columns and the walls of said shell; combustion gas ducts formed of wedge-shaped bricks of refractory material in the shape of an inverted U, said bricks extending inwardly and downwardly from said combustion chamber into said heating chamber, said ducts being disposed in substantially annular layers with each side of each brick being in contact with a side of an adjacent brick, the heating chamber end of the uppermost layer being adjacent the walls of said heating chamber and each successive lower layer extending progressively farther into said heating chamber; an annular tunnel formed in the bottom of said combustion chamber, the upper side of said tunnel being open to said combustion chamber; a plurality of substantially upright burners disposed around the lower portion of said combustion chamber and extending into said annular tunnel; baffle members positioned above each of said burners; and a plenum chamber, provided with inlet means and outlet means disposed below said shell and around the flared end of said pebble outlet conduit.

9. In a pebble heater apparatus utilizing a gravitating bed of heated pebbles, an improved pebble heating chamber which comprises a substantially upright, closed shell enclosing a heating chamber therein; pebble inlet and effluent outlet means in the upper portion of said chamber; pebble outlet means in the lower portion of said heating chamber; a combustion chamber disposed about the lower periphery of said heating chamber; wedge-shaped, refractory bricks formed substantially in the shape of an inverted U arranged concentrically in superposed layers around the bottom of said heating chamber so as to extend inwardly and downwardly from said combustion chamber into said heating chamber, each side of each brick being in contact with a side of an adjacent brick, the heating chamber ends of the uppermost layer of bricks being adjacent the walls of said heating chamber and each successive lower layer of bricks extending progressively farther into said heating chamber; heating means disposed in said combustion chamber, said heating means comprising a plurality of substantially upright burners disposed around the lower portion of said combustion chamber; and a plurality of baffle members positioned above each of said burners.

10. The apparatus of claim 9 in which the heating chamber ends of said bricks are cut outwardly away from the center of the heating chamber and downwardly.

11. In a pebble heater apparatus utilizing a gravitating bed of heated pebbles, an improved pebble heating chamber which comprises a substantially upright, closed shell enclosing a heating chamber therein; refractory material lining the interior of said shell so as to insulate same; pebble inlet and effluent outlet means in the upper portion of said shell; an imperforate pebble outlet conduit in the lower portion of said shell, the upper end of said conduit being flared; a substantially conical, imperforate baffle member disposed in the lower portion of said heating chamber immediately above and in contact with the flared end of said pebble outlet conduit; an expansion joint between said conical baffle member and the flared end of said pebble outlet conduit; a pebble soaking chamber formed by said conical baffle member and the flared end of said pebble outlet conduit; a plurality of pebble conduit means disposed around the periphery of the lower portion of said conical baffle member communicating said heating chamber with said pebble soaking chamber; a combustion chamber disposed about the lower periphery of said heating chamber; a plurality of supporting columns formed of refractory material disposed in the lower portion of said heating chamber adjacent to said combustion chamber and extending between the refractory material lining the walls of said shell and the bottom portion of said shell; a perforated retaining wall positioned between each of said columns and the walls of said shell; combustion gas ducts formed of wedge-shaped bricks of refractory material in the shape of an inverted U, said bricks extending inwardly and downwardly from said combustion chamber into said heating chamber, said ducts being disposed in substantially annular layers with each side of each brick being in contact with a side of an adjacent brick, the heating chamber end of the uppermost layer being adjacent the walls of said heating chamber and each successive lower layer extending progressively farther into said heating chamber; an annular tunnel formed in the bottom of said combustion chamber, the upper side of said tunnel being open to said combustion chamber; a plurality of substantially upright burners disposed around the lower portion of said combustion chamber and extending into said annular tunnel; baffle members positioned across said annular tunnel above each of said burners; and a plenum chamber, provided with inlet means and outlet means disposed below said shell and around the flared end of said pebble outlet conduit.

12. The apparatus of claim 11 in which the air outlet means of said air plenum chamber is connected to each of said burners.

References Cited in the file of this patent

UNITED STATES PATENTS

| | | |
|---|---|---|
| 1,102,714 | Bornmann | July 7, 1914 |
| 2,345,067 | Osann | Mar. 28, 1944 |
| 2,398,954 | Odell | Apr. 23, 1946 |
| 2,514,722 | Robinson | July 11, 1950 |
| 2,561,420 | Schutte | July 24, 1951 |
| 2,582,116 | Goins | Jan. 8, 1952 |
| 2,620,175 | Weber | Dec. 2, 1952 |
| 2,706,109 | Odman | Apr. 12, 1955 |

UNITED STATES PATENT OFFICE
CERTIFICATE OF CORRECTION

Patent No. 2,880,983                                                 April 7, 1959

Curt E. Forkel et al.

It is hereby certified that error appears in the printed specification of the above numbered patent requiring correction and that the said Letters Patent should read as corrected below.

Column 2, line 29, for "pebbles" read -- pebble --; column 9, line 36, for "a substantially, imperforate conical" read -- a substantially conical, imperforate --.

Signed and sealed this 19th day of January 1960.

(SEAL)
Attest:

KARL H. AXLINE                                                ROBERT C. WATSON

Attesting Officer                                             Commissioner of Patents